US011739839B2

(12) United States Patent  
Matsuo

(10) Patent No.: US 11,739,839 B2  
(45) Date of Patent: Aug. 29, 2023

(54) PARKING MECHANISM AND DRIVE APPARATUS

(71) Applicant: NIDEC CORPORATION, Kyoto (JP)

(72) Inventor: Hideaki Matsuo, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/581,986

(22) Filed: Jan. 24, 2022

(65) Prior Publication Data

US 2022/0243811 A1 Aug. 4, 2022

(30) Foreign Application Priority Data

Jan. 29, 2021 (JP) ................................. 2021-012964

(51) Int. Cl.
*F16H 63/34* (2006.01)

(52) U.S. Cl.
CPC ................ *F16H 63/3433* (2013.01)

(58) Field of Classification Search
CPC ............. F16H 63/3458; F16H 63/3433; F16H 63/3425; F16H 63/3441
See application file for complete search history.

(56) References Cited

U.S. PATENT DOCUMENTS

| 2007/0062780 A1* | 3/2007 | Kusamoto | F16H 63/3425 192/219.5 |
| 2011/0005891 A1* | 1/2011 | Hongawara | F16H 63/3416 192/219.4 |
| 2011/0278132 A1* | 11/2011 | Dopfert | F16H 63/3425 192/219.5 |
| 2014/0231213 A1* | 8/2014 | Isomura | F16H 63/3425 192/219.5 |

FOREIGN PATENT DOCUMENTS

| CN | 107606145 A | 1/2018 |
| CN | 108916376 A | 11/2018 |
| CN | 112539269 A | * 3/2021 |
| JP | 6061039 B2 | 1/2017 |
| JP | 2018158619 A | * 10/2018 |
| JP | 6442736 B2 | 12/2018 |
| JP | 6504952 B2 | 4/2019 |
| JP | 2019158078 A | 9/2019 |
| JP | 6633900 B2 | 1/2020 |
| JP | 6663095 B2 | 3/2020 |
| JP | 6714482 B2 | 6/2020 |
| JP | 6714483 B2 | 6/2020 |
| JP | 2020128791 A | 8/2020 |

* cited by examiner

*Primary Examiner* — Lori Wu

(74) *Attorney, Agent, or Firm* — HAUPTMAN HAM, LLP

(57) ABSTRACT

A parking mechanism includes: a parking gear rotatable about a major axis with a wheel of a vehicle; a parking pawl rotatable about a first axis parallel to the major axis, and having a meshing portion facing a tooth portion of the parking gear; a cam rod extending and operating along a first direction orthogonal to the major axis; a cam attached to the cam rod, contacting the parking pawl, and movable along the first direction with the operation of the cam rod to rotate the parking pawl around the first axis and move the meshing portion toward the parking gear; a U-shaped sleeve open toward the parking pawl and supporting the cam; and a pawl stopper to contact and restrict movement of the parking pawl toward the cam rod. The cam rod is inserted into the sleeve. The pawl stopper is between the parking pawl and the cam rod.

17 Claims, 7 Drawing Sheets

PARKING MECHANISM AND DRIVE APPARATUS

CROSS-REFERENCE TO RELATED APPLICATIONS

The present invention claims priority under 35 U.S.C. § 119 to Japanese Patent Application No. 2021-012964 filed on Jan. 29, 2021, the entire content of which is incorporated herein by reference.

FIELD OF THE INVENTION

The present invention relates to a parking mechanism and a drive apparatus.

BACKGROUND

A parking mechanism is mounted on a drive apparatus that drives a vehicle. A conventional parking mechanism pushes a parking pawl toward a parking gear by moving a cam with a parking rod, to lock the parking gear and the parking pawl.

In recent years, downsizing of a drive apparatus has been progressing. Along with this, there is a demand for downsizing of a parking mechanism arranged in a housing of the drive apparatus. In conventional parking mechanisms, a parking rod and a parking pawl are arranged orthogonal to each other, so that there is a problem that a large accommodation space is required in the housing.

SUMMARY

An exemplary parking mechanism of the present invention includes: a parking gear that rotates about a major axis in conjunction with a wheel of a vehicle; a parking pawl that has a meshing portion facing a tooth portion of the parking gear and is rotatable about a first rotation axis parallel to the major axis; a cam rod that extends along a first direction orthogonal to the major axis and operates along the first direction; a cam that is attached to the cam rod, is in contact with a cam contact portion of the parking pawl, and moves along the first direction with the operation of the cam rod to rotate the parking pawl around the first rotation axis and move the meshing portion toward the parking gear; a U-shaped sleeve that is open toward the parking pawl and supports the cam; and a pawl stopper that comes into contact with a stopper contact portion of the parking pawl to restrict movement of the parking pawl toward the cam rod. The cam rod is inserted into the sleeve. The pawl stopper is arranged between the parking pawl and the cam rod.

An exemplary drive apparatus of the present invention includes the above-described parking mechanism, a power unit that drives the vehicle, and a transmission mechanism connected to the power unit. The parking mechanism is attached to the transmission mechanism.

The above and other elements, features, steps, characteristics and advantages of the present disclosure will become more apparent from the following detailed description of the preferred embodiments with reference to the attached drawings.

DETAILED DESCRIPTION

Figure 1:
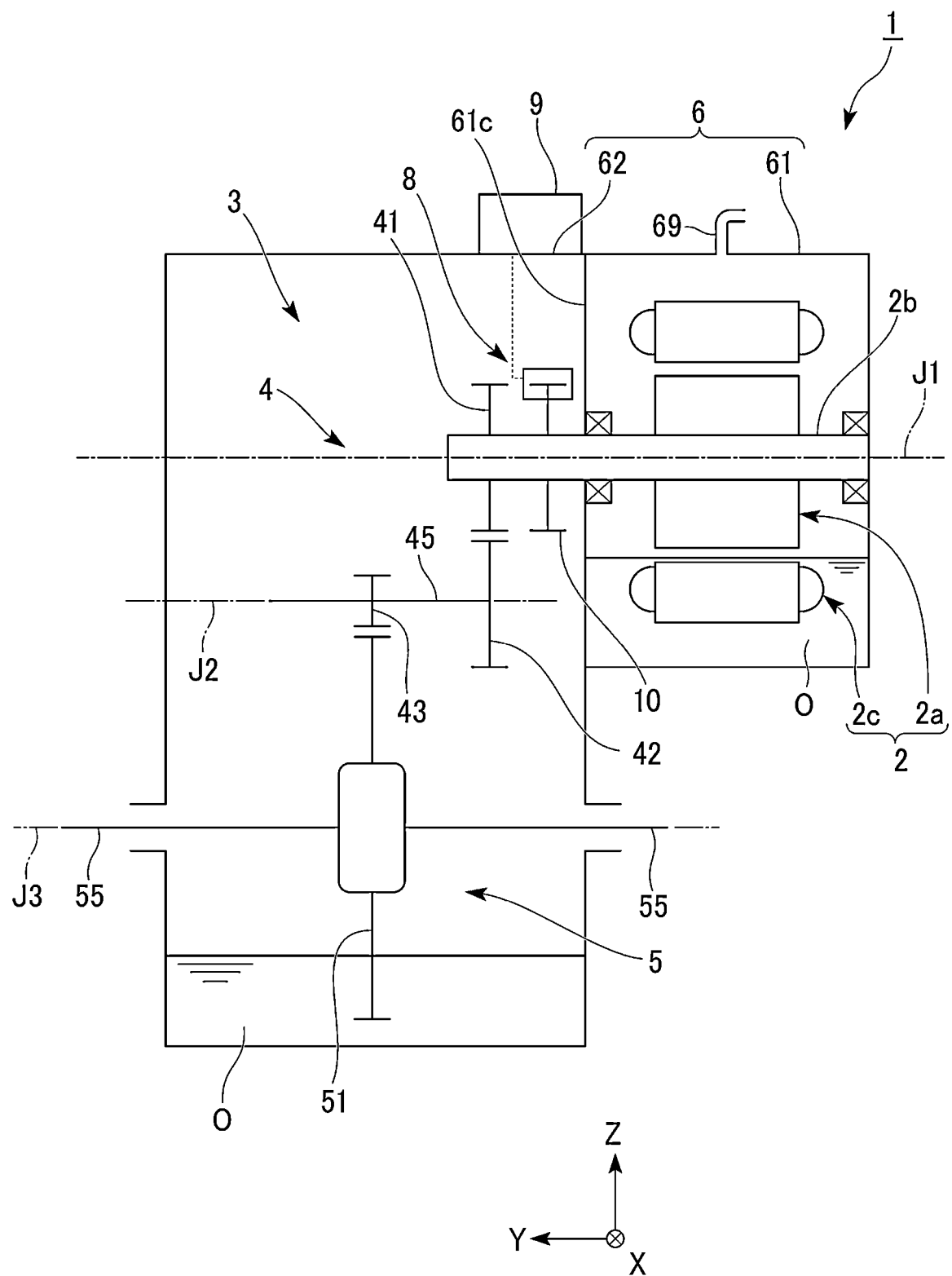
FIG. 1 is a diagram schematically illustrating a drive apparatus according to an embodiment.

In description below, a vertical direction is defined based on a positional relationship when a drive apparatus 1 of the present embodiment is mounted on a vehicle (not illustrated) positioned on a horizontal road surface. Further, in the drawings, an XYZ coordinate system is illustrated appropriately as a three-dimensional orthogonal coordinate system.

In each drawing, a Z-axis direction corresponds to the vertical direction. A +Z side is an upper side in the vertical direction, and a −Z side is a lower side in the vertical direction. In the present embodiment, the upper side in the vertical direction will be referred to simply as the "upper side" and the lower side in the vertical direction will be simply referred to as the "lower side". An X-axis direction is a direction orthogonal to the Z-axis direction and is a vehicle front-rear direction on which the drive apparatus 1 is mounted. In the present embodiment, a +X side is a front side of the vehicle, and a −X side is a rear side of the vehicle. A Y-axis direction is a direction orthogonal to both the X-axis direction and the Z-axis direction, and is a left-right direction of the vehicle, that is, a vehicle width direction. In the present embodiment, a +Y side is a left side of the vehicle, and a −Y side is a right side of the vehicle. The Y-axis direction corresponds to an axial direction of a major axis J1 to be described later. Each of the front-rear direction and the left-right direction is a horizontal direction orthogonal to the vertical direction. In the present embodiment, the +Y side corresponds to one side in the axial direction, and the −Y side corresponds to the other side in the axial direction. The major axis J1 illustrated as appropriate in each drawing extends in the Y-axis direction, that is, the left-right direction of the vehicle.

FIG. 1 is a conceptual diagram schematically illustrating the drive apparatus 1. The drive apparatus 1 according to the present embodiment is mounted in a vehicle having a motor as a power source, such as a hybrid vehicle (HEV), a plug-in hybrid vehicle (PHV), and an electric vehicle (EV), and is used as a power source of the vehicle.

The drive apparatus 1 includes a motor (power unit) 2, a gear unit (transmission mechanism) 3 including a speed reducer 4 and a differential 5, a parking mechanism 8, a housing 6, and oil O. The motor 2 drives the vehicle. The gear unit 3 is connected to the motor 2. The parking mechanism 8 is attached to the gear unit 3.

The housing 6 includes a motor accommodation portion 61 that accommodates the motor 2, a gear accommodation portion 62 that accommodates the gear unit 3 and the parking mechanism 8, and a partition 61c provided between the motor accommodation portion 61 and the gear accommodation portion 62.

The oil O is stored in the gear accommodation portion 62. The oil O is scraped up by the gear unit 3 to improve the lubricity of a tooth surface of the gear unit 3. Further, the oil O may be supplied to the motor 2. In this case, the oil O cools the motor.

A catch tank (not illustrated) that receives oil scraped up by the gear unit 3 may be provided on an inner wall portion of the gear accommodation portion 62. In this case, a flow path for guiding the received oil to each portion in the housing 6 is connected to the catch tank. The catch tank opens upward in a gravity direction. For this reason, the posture of the drive apparatus 1 with respect to the gravity direction during use can be checked based on an opening direction of the catch tank.

The motor accommodation portion 61 is provided with a breather device 69. That is, the housing 6 has the breather device 69. The breather device 69 allows the inside and the outside of the housing 6 to communicate with each other. The breather device 69 is provided on the upper side in the gravity direction. In this manner, the oil O can be prevented from leaking from the breather device 69. The posture of the drive apparatus 1 with respect to the gravity direction during use can be checked based on the arrangement of the breather device 69.

The motor 2 includes a rotor 2a and a stator 2c. In the present embodiment, the motor 2 is an inner rotor motor. Therefore, the stator 2c surrounds the radially outer side of the rotor 2a. The rotor 2a is arranged to be capable of rotating about the major axis J1 extending in the horizontal direction. The rotor 2a has a motor shaft 2b extending along the axial direction about the major axis J1.

The motor shaft 2b rotates about the major axis J1. The motor shaft 2b extends across the motor accommodation portion 61 and the gear accommodation portion 62 of the housing 6. A left end portion of the motor shaft 2b protrudes inside the gear accommodation portion 62. A first gear 41, which will be described below, of the gear unit 3 is fixed to the left end portion of the motor shaft 2b.

The gear unit 3 is accommodated in the gear accommodation portion 62 of the housing 6. The gear unit 3 is connected to the motor 2. More specifically, the gear unit 3 is connected on one side in the axial direction of the motor shaft 2b. The gear unit 3 has the speed reducer 4 and the differential 5. A torque output from the motor 2 is transmitted to the differential 5 through the speed reducer 4.

The speed reducer 4 is connected to the motor 2. The speed reducer 4 increases the torque output from the motor 2 in accordance with a reduction ratio while reducing a rotation speed of the motor 2. The speed reducer 4 transmits the torque output from the motor 2 to the differential 5. The speed reducer 4 includes a first gear 41, a second gear 42, a third gear 43, and an intermediate shaft 45.

The first gear 41 is fixed to the left end portion of the motor shaft 2b. The first gear 41 rotates about the major axis J1 together with the motor shaft 2b. The intermediate shaft 45 extends along an intermediate axis J2 parallel to the major axis J1. The intermediate shaft 45 is arranged to rotate about the intermediate axis J2. The second gear 42 and the third gear 43 are fixed to an outer peripheral surface of the intermediate shaft 45 at an interval in the axial direction. The second gear 42 and the third gear 43 are connected to each other through the intermediate shaft 45. Each of the second gear 42 and the third gear 43 is arranged to rotate about the intermediate axis J2. The second gear 42 is arranged to mesh with the first gear 41. The third gear 43 is arranged to mesh with a ring gear 51, which will be described below, of the differential 5.

The torque output from the motor 2 is transmitted to the ring gear 51 of the differential 5 through the motor shaft 2b, the first gear 41, the second gear 42, the intermediate shaft 45, and the third gear 43 in this order. The number of gears, gear ratios of the gears, and the like can be modified appropriately in accordance with a desired reduction ratio. In the present embodiment, the speed reducer 4 is a speed-reduction device of a parallel-axis gearing type in which center axes of gears are arranged in parallel with each other.

The differential 5 is connected to the motor 2 via the speed reducer 4. The differential 5 is a device configured to transmit the torque output from the motor 2 to a wheel of the vehicle. The differential 5 transmits the same torque to axles 55 of right and left wheels while absorbing a speed difference between the right and left wheels when the vehicle turns. The differential 5 includes the ring gear 51, a gear housing (not illustrated), a pair of pinion gears (not illustrated), a pinion shaft (not illustrated), and a pair of side gears (not illustrated). The ring gear 51 rotates about a differential axis J3 parallel to the major axis J1. The torque output from the motor 2 is transferred to the ring gear 51 through the speed reducer 4.

Note that the axle 55 extends along a direction (that is, in the width direction of the vehicle) orthogonal to a traveling direction of the vehicle. Therefore, the traveling direction of the vehicle in a state where the drive apparatus 1 is mounted is estimated based on the extending direction of the axle 55.

The parking mechanism 8 restricts the driving of the gear unit 3. The parking mechanism 8 is driven by an electric actuator 9. A state of the parking mechanism 8 is switched between a locked state in which the rotation of the motor shaft 2b is stopped and an unlocked state in which the rotation of the motor shaft 2b is allowed by the electric actuator 9 as a power source. The parking mechanism 8 is in the locked state in a case where the gear of the vehicle is parking, and is in the unlocked state in a case where the gear of the vehicle is other than parking. The case where the gear of the vehicle is other than parking includes, for example, a case where the gear of the vehicle is drive, neutral, reverse, or the like.

Figure 2:
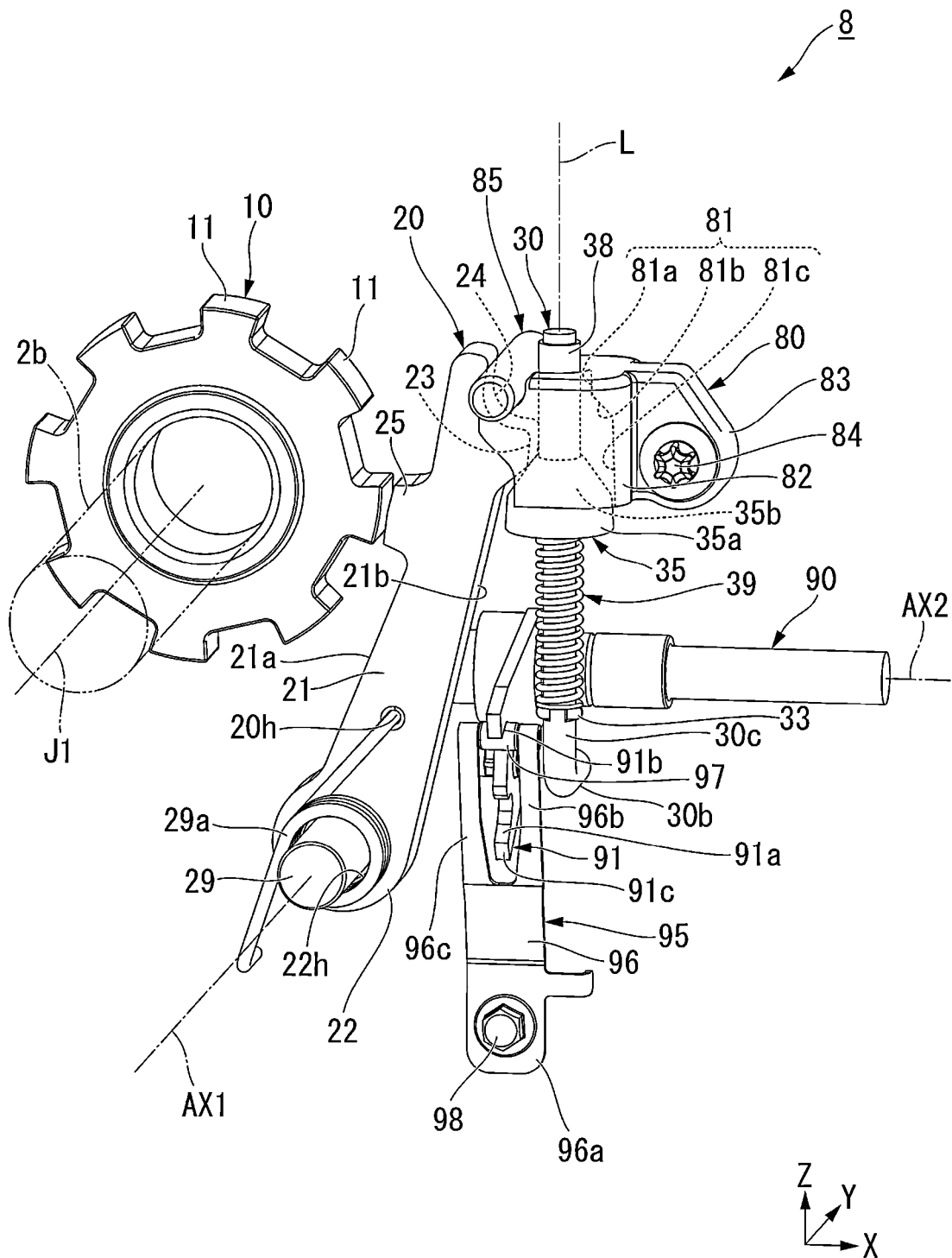
FIG. 2 is a perspective view of the parking mechanism according to the embodiment.

FIG. 2 is a perspective view of the parking mechanism 8.

In the following description, an up-down direction (Z-axis direction) will be sometimes referred to as a first direction, and the vehicle front-rear direction (X-axis direction) will be sometimes referred to as a second direction. That is, the first direction and the second direction are directions orthogonal to each other. The first direction and the second direction are orthogonal to the major axis J1. Further, the lower side will be referred to as one side in the first direction, and the upper side will be referred to as the other side in the first direction.

The parking mechanism 8 includes a parking gear 10, a pawl shaft 29, a parking pawl 20, a cam rod 30, a cam 35, a coil spring 39, a sleeve 80, a pawl stopper 85, a manual shaft 90, a flange portion 91, an elastic member 95, and the electric actuator 9.

As illustrated in FIG. 1, the parking gear 10 is fixed to an outer peripheral surface of the motor shaft 2b. The parking gear 10 is arranged between the first gear 41 and the partition 61c in the axial direction.

As illustrated in FIG. 2, the parking gear 10 of the present embodiment has an annular shape around the major axis J1, and is fitted to the outer peripheral surface of the motor shaft 2b. The parking gear 10 rotates together with the motor shaft 2b. That is, the parking gear 10 rotates about the major axis J1 in conjunction with the wheels of the vehicle. A plurality of tooth portions 11 arranged in a circumferential direction are provided on an outer periphery of the parking gear 10. The tooth portion 11 protrudes outward in the radial direction.

The pawl shaft 29 extends along a first rotation axis AX1 parallel to the major axis J1. That is, the pawl shaft 29 is a shaft parallel to the motor shaft 2b. The pawl shaft 29 rotatably supports the parking pawl 20.

A winding spring 29a is mounted on the pawl shaft 29. The winding spring 29a has a spring main body having a coil shape and spring end portions extending from both end portions of the spring main body. The pawl shaft 29 is inserted into the spring end portion of the winding spring 29a. The spring end portion of the winding spring 29a on one side is hooked on a spring hooking portion (not illustrated) provided on an inner surface of the housing 6. The spring end portion of the winding spring 29a on the other side is hooked on a spring hooking hole 20h provided on the parking pawl 20. The winding spring 29a applies an elastic force to the parking pawl 20 in a direction in which a distal end is retracted toward the sleeve 80.

The parking pawl 20 is arranged on a side portion of the parking gear 10. The parking pawl 20 has a plate shape whose thickness direction is the axial direction of the major axis J1. The parking pawl 20 has a base end portion 22, a parking pawl main body portion 21 extending upward from the base end portion 22, a cam contact portion (acting portion) 23, a stopper contact portion 24, and a meshing portion 25.

The parking pawl main body portion 21 extends along the up-down direction. The parking pawl main body portion 21 is arranged between the parking gear 10 and the sleeve 80 when viewed from the axial direction of the major axis J1. The parking pawl main body portion 21 has a gear facing surface 21a facing the parking gear 10 side and a sleeve facing surface 21b facing the sleeve 80 side. In the present embodiment, the meshing portion 25 is located on the gear facing surface 21a, and the cam contact portion 23 and the stopper contact portion 24 are located on the sleeve facing surface 21b. Further, the meshing portion 25, the cam contact portion 23, and the stopper contact portion 24 are arranged in this order from the base end portion 22 side (that is, the lower side) to the distal end side (that is, the upper side).

The base end portion 22 is provided with a support hole 22h around the first rotation axis AX1. The pawl shaft 29 is inserted into the support hole 22h. As a result, the parking pawl 20 is supported by the pawl shaft 29 at the base end portion 22, and is rotatable about the first rotation axis AX1 by the pawl shaft 29. That is, the parking pawl 20 is rotatable about the first rotation axis AX1.

The meshing portion 25 protrudes from the gear facing surface 21a of the parking pawl main body portion 21 toward the parking gear 10. The meshing portion 25 faces the tooth portion 11 of the parking gear 10. When the parking pawl 20 rotates around the pawl shaft 29, the meshing portion 25 moves in directions of approaching and being separated from the parking gear 10. In the parking mechanism 8 in the locked state, the meshing portion 25 is fitted between the tooth portions 11 of the parking gear 10. That is, the meshing portion 25 meshes with the tooth portions 11 of the parking gear 10 in the locked state. In the parking mechanism 8 in the unlocked state, the meshing portion 25 is retracted from between the tooth portions 11.

The cam contact portion 23 protrudes from the sleeve facing surface 21b of the parking pawl main body portion 21 toward the sleeve 80. The cam contact portion 23 faces an opening of the sleeve 80. The cam contact portion 23 faces the cam rod 30. The cam contact portion 23 comes into contact with the cam 35 as the cam 35 moves upward. The cam contact portion 23 is in contact with the cam 35 in the parking mechanism 8 in the locked state and is separated from the cam 35 in the parking mechanism 8 in the unlocked state.

The stopper contact portion 24 is located on the sleeve facing surface 21b of the parking pawl main body portion 21 and on the upper side of the cam contact portion 23. The stopper contact portion 24 has a concave shape recessed from the parking pawl main body portion 21 toward the parking gear 10. The stopper contact portion 24 is separated from the pawl stopper 85 in the parking mechanism 8 in the locked state, and is in contact with the pawl stopper 85 in the parking mechanism 8 in the unlocked state. Since the stopper contact portion 24 has the concave shape recessed toward the parking gear 10 according to the present embodiment, the pawl stopper 85 can be arranged close to the parking gear 10 side in the unlocked state. As a result, the parking mechanism 8 can be downsized in the second direction (X-axis direction).

The parking pawl 20 is applied with a force from the cam 35 toward the parking gear 10 at the cam contact portion 23, and meshes with the tooth portions 11 of the parking gear 10 at the meshing portion 25. Further, the movement of the parking pawl 20 toward the sleeve 80 is restricted at the stopper contact portion 24.

The respective portions of the parking pawl 20 of the present embodiment are arrayed in the order of the first rotation axis AX1, the meshing portion 25, the cam contact portion 23, and the stopper contact portion 24 from the lower side to the upper side. According to the present embodiment, the distance between the cam contact portion 23 and the first rotation axis AX1 is larger than the distance between the meshing portion 25 and the first rotation axis AX1. For this reason, a force for inserting the meshing portion 25 between the tooth portions 11 can be increased by the force applied from the cam 35 in the cam contact portion 23 according to the principle of the lever, so that the meshing portion 25 can be smoothly inserted between the tooth portions 11. Further, the stopper contact portion 24 is provided at a distal end of the parking pawl main body portion 21, and can secure a larger distance from the first rotation axis AX1 than other portions according to the present embodiment. For this reason, the force applied from the stopper contact portion 24 to the pawl stopper 85 can be reduced in the parking mechanism in the unlocked state, so that the pawl stopper 85 can be downsized.

The manual shaft 90 extends along the second rotation axis AX2. The second rotation axis AX2 is an axis extending in the second direction (X-axis direction). Therefore, the manual shaft 90 extends in a direction orthogonal to the motor shaft 2b and the pawl shaft 29.

The manual shaft 90 extends into and out of the housing 6. The manual shaft 90 is connected to the cam rod 30 via the flange portion 91 inside the housing 6. The manual shaft 90 is connected to the electric actuator 9 outside the housing 6. The manual shaft 90 rotates about the second rotation axis AX2 by the power of the electric actuator 9.

Figure 3:
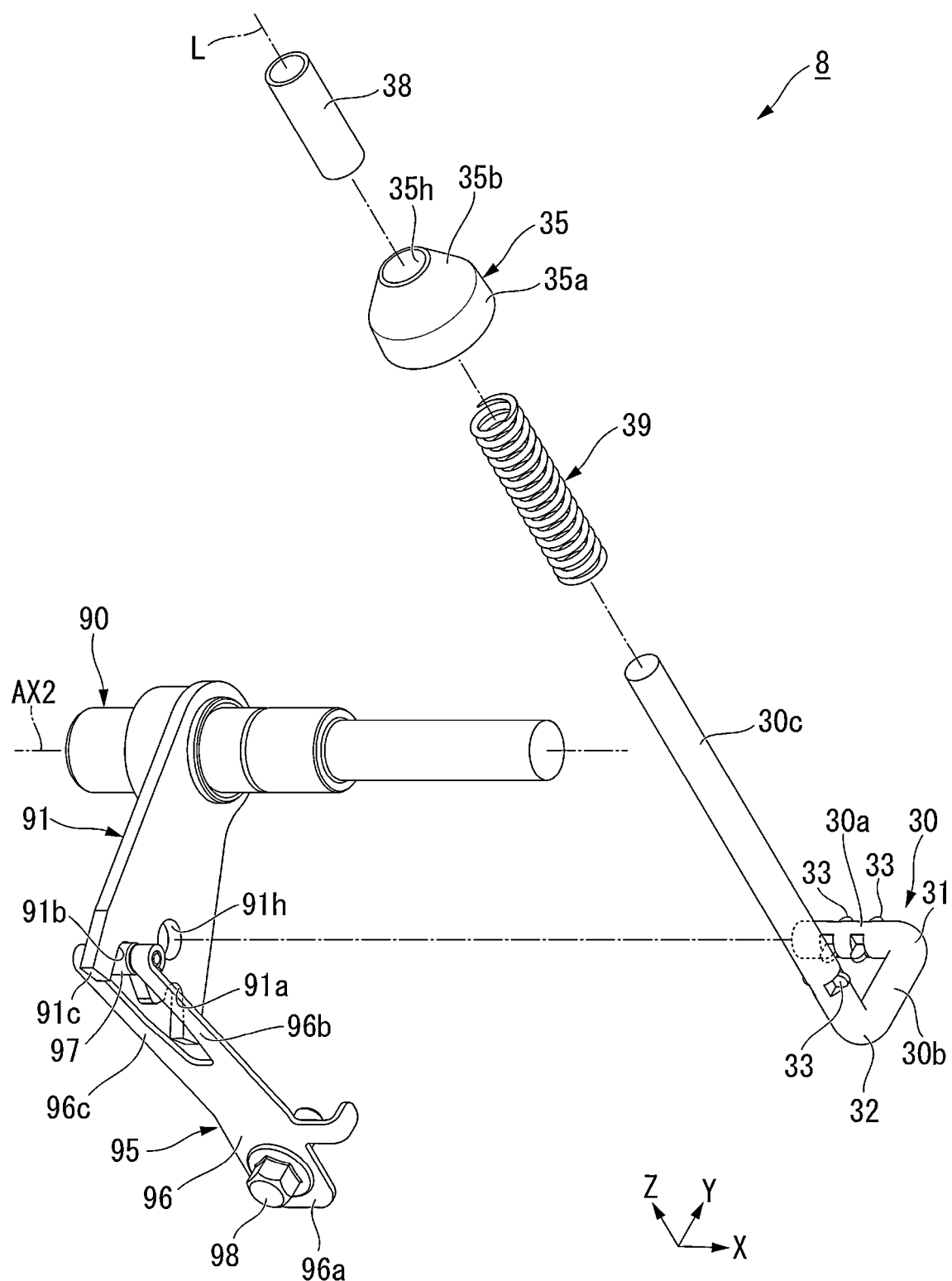
FIG. 3 is an exploded view of a part of the parking mechanism according to the embodiment.

FIG. 3 is an exploded view of a part of the parking mechanism 8.

The flange portion 91 is fixed to an outer peripheral surface of the manual shaft 90. The flange portion 91 extends radially outward with respect to the second rotation axis AX2. The flange portion 91 has a plate shape orthogonal to the second rotation axis AX2. The flange portion 91 rotates about the second rotation axis AX2 together with the manual shaft 90.

The flange portion 91 has an outer surface 91c facing the radially outer side of the second rotation axis AX2. The outer surface 91c of the flange portion 91 is provided with a first groove portion 91a and a second groove portion 91b. The first groove portion 91a and the second groove portion 91b are arranged along the circumferential direction of the second rotation axis AX2. The first groove portion 91a and the second groove portion 91b are open to the radially outer side of the second rotation axis AX2.

The flange portion 91 is provided with a connection hole 91h penetrating in the thickness direction. A lower end portion of the cam rod 30 passes through the connection hole 91h. As a result, the lower end portion of the cam rod 30 is rotatable about the connection hole 91h.

The elastic member 95 includes a leaf spring portion 96 and a roller 97. The leaf spring portion 96 has a plate shape with a plate surface facing the axial direction of the major axis J1. The leaf spring portion 96 extends in the up-down direction. A lower end portion of the leaf spring portion 96 is fixed to an inner surface of the housing 6 by a screw 98. An upper end portion of the leaf spring portion 96 is located on a side portion of the manual shaft 90. The upper end portion of the leaf spring portion 96 can be elastically displaced in the axial direction of the major axis J1 with the lower end portion of the leaf spring portion 96, fixed by the screw 98, as a fulcrum.

The leaf spring portion 96 has a base portion 96a and a pair of arm portions 96b and 96c. The base portion 96a is, for example, a lower part of the leaf spring portion 96. The base portion 96a is provided with a through hole into which the screw 98 for fixing the leaf spring portion 96 to the housing 6 is inserted. The pair of arm portions 96b and 96c extend upward from an upper end portion of the base portion 96a. The pair of arm portions 96b and 96c are arrayed side by side at an interval in the second direction (X-axis direction).

The roller 97 is rotatable about a rotation axis extending in the second direction (X-axis direction). The roller 97 is attached to the upper end portion of the leaf spring portion 96. The roller 97 extends in the second direction (X-axis direction). The roller 97 has a shaft portion connecting upper end portions of the pair of arm portions 96b and 96c and a rotation portion through which the shaft portion passes. The roller 97 rotates with respect to the leaf spring portion 96 in the rotation portion. The roller 97 is in contact with the outer surface 91c of the flange portion 91. As the flange portion 91 rotates about the second rotation axis AX2, the roller 97 moves while rolling between the first groove portion 91a and the second groove portion 91b on the outer surface 91c.

The roller 97 can be fitted into the first groove portion 91a and the second groove portion 91b. In this manner, the elastic member 95 is caught by the first groove portion 91a or the second groove portion 91b, and positions the flange portion 91 around the second rotation axis AX2.

The roller 97 is fitted into the first groove portion 91a in the parking mechanism 8 in the locked state, and is fitted into the second groove portion 91b in the parking mechanism 8 in the unlocked state. When the state of the parking mechanism 8 is switched between the locked state and the unlocked state, the roller 97 moves between the first groove portion 91a and the second groove portion 91b while the leaf spring portion 96 is elastically deformed.

The cam rod 30 has a connection end portion 30a, a joint portion 30b, a rod main body 30c, and a tubular cap 38. In the cam rod 30, a first bent portion 31 is provided between the connection end portion 30a and the joint portion 30b, and a second bent portion 32 is provided between the joint portion 30b and the rod main body 30c. The cam rod 30 has a rod shape with a circular cross section bent in the first bent portion 31 and the second bent portion 32.

The connection end portion 30a extends along the second direction (X-axis direction). The connection end portion 30a is inserted into the connection hole 91h of the flange portion 91. Two locking protrusions 33 arrayed in the length direction of the connection end portion 30a are provided on an outer periphery of the connection end portion 30a. The two locking protrusions 33 are arranged on both sides of the flange portion 91. In this manner, the connection end portion 30a is connected to the flange portion 91. That is, the cam rod 30 is connected to the manual shaft 90 via the flange portion 91 in the connection end portion 30a. As described above, the manual shaft 90 is connected to the electric actuator 9 and rotates about the second rotation axis AX2. The cam rod 30 is driven along the up-down direction by the manual shaft 90.

The joint portion 30b extends along the axial direction of the major axis J1. One end of the joint portion 30b is connected to the connection end portion 30a. Further, the other end of the joint portion 30b is connected to a lower end of the rod main body 30c.

As illustrated in FIG. 2, the rod main body 30c extends along the up-down direction (first direction). That is, the cam rod 30 extends along the up-down direction in the rod main body 30c. The rod main body 30c passes through the inside of the sleeve 80. That is, the cam rod 30 is inserted into the sleeve 80 in the rod main body 30c. In this manner, the rod main body 30c is guided by the sleeve 80. Further, the cam rod 30 moves along the up-down direction with the rotation of the flange portion 91 along the second rotation axis AX2.

The locking protrusions 33 are provided on an outer peripheral surface of the rod main body 30c. The coil spring 39, the cam 35, and the tubular cap 38 pass through the rod main body 30c.

The coil spring 39 is located below the cam 35. A lower end of the coil spring 39 is in contact with the locking protrusion 33. On the other hand, an upper end of the coil spring 39 is in contact with a lower end surface of the cam 35. The coil spring 39 is arranged between the locking protrusion 33 and the cam 35 in a state of being compressed with respect to a natural length. The coil spring 39 applies a force acting upward to the cam 35.

The tubular cap 38 is fixed to the rod main body 30c. The tubular cap 38 is located above the cam 35. A lower end of the tubular cap 38 is in contact with an upper end surface of the cam 35. The tubular cap 38 restricts the upward movement of the cam 35.

As illustrated in FIG. 3, the cam 35 has an annular shape when viewed from the up-down direction. The cam 35 is provided with a through hole 35h through which the rod main body 30c passes. An inner diameter of the through hole 35h is larger than an outer diameter of the rod main body 30c. The tubular cap 38 is arranged at an upper end portion of a movable range of the cam 35. The tubular cap 38 restricts the upward movement of the cam 35. On the other hand, a lower end of the cam 35 is in contact with the upper end of the coil spring 39. The coil spring 39 is compressed as the cam 35 moves downward. The cam 35 moves downward with respect to the rod main body 30c when receiving a force that acts downward and is larger than a repulsive force of the coil spring 39.

The cam 35 is in contact with the cam contact portion 23 of the parking pawl 20 on the outer peripheral surface. A first conical surface 35a and a second conical surface 35b are provided on the outer peripheral surface of the cam 35. The first conical surface 35a and the second conical surface 35b are conical tapered surfaces which are coaxially arranged and each of which has an outer diameter gradually decreasing from the lower side to the upper side. The second conical surface 35b is located above the first conical surface 35a. The outer diameter of a lower end of the second conical surface 35b and the outer diameter of an upper end of the first conical surface 35a coincide with each other. A taper angle of the first conical surface 35a is sufficiently smaller than a taper angle of the second conical surface 35b. The taper angle of the second conical surface 35b is set to an angle sufficient for the cam 35 to be smoothly detached from between the sleeve 80 and the cam contact portion 23 at the time of transition from the locked state to the unlocked state. Note that the first conical surface 35a may be a cylindrical surface having a cylindrical shape instead of the conical shape.

Figure 4:
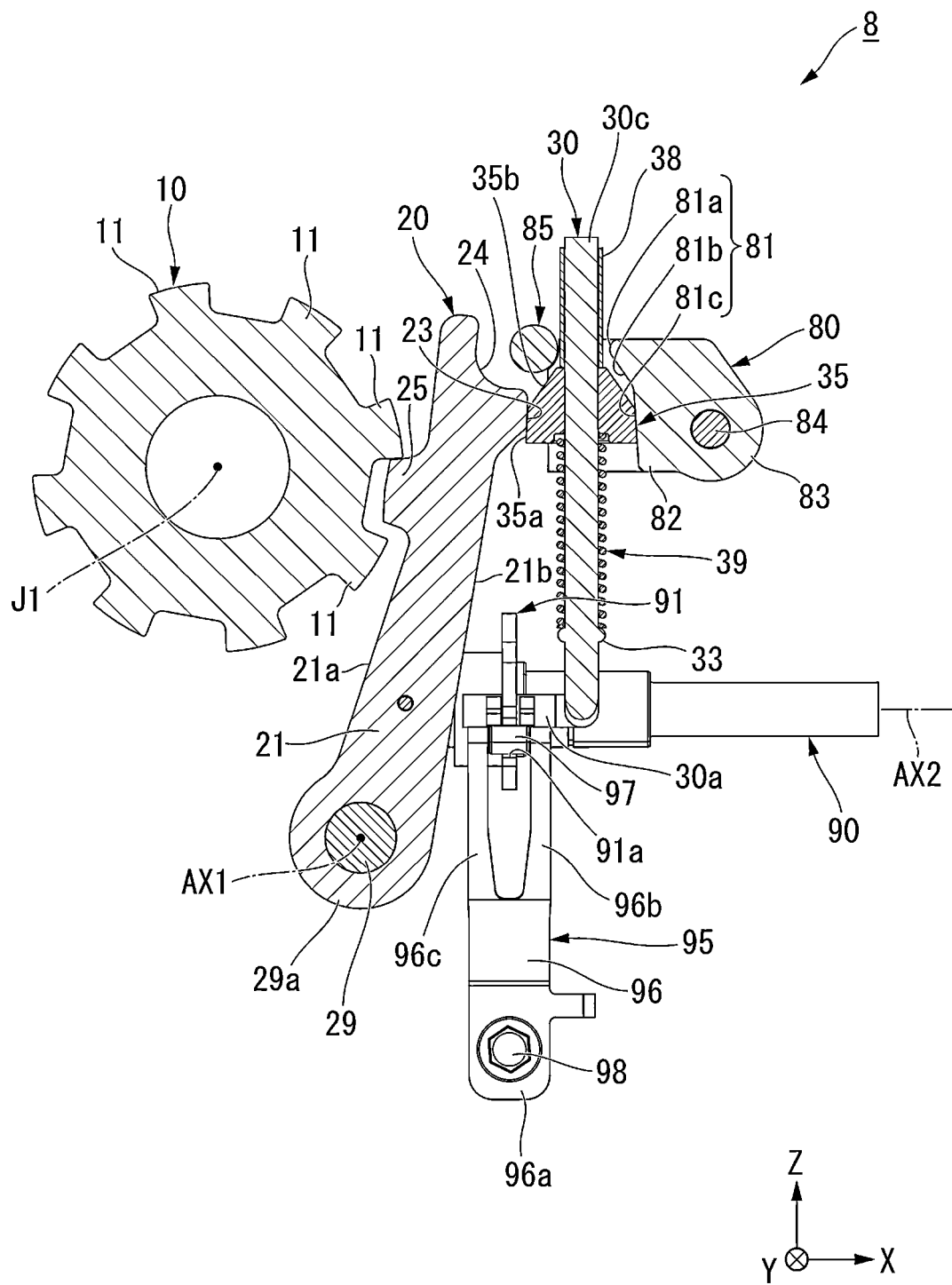
FIG. 4 is a cross-sectional view of the parking mechanism in a locked state according to the embodiment.
Figure 5:
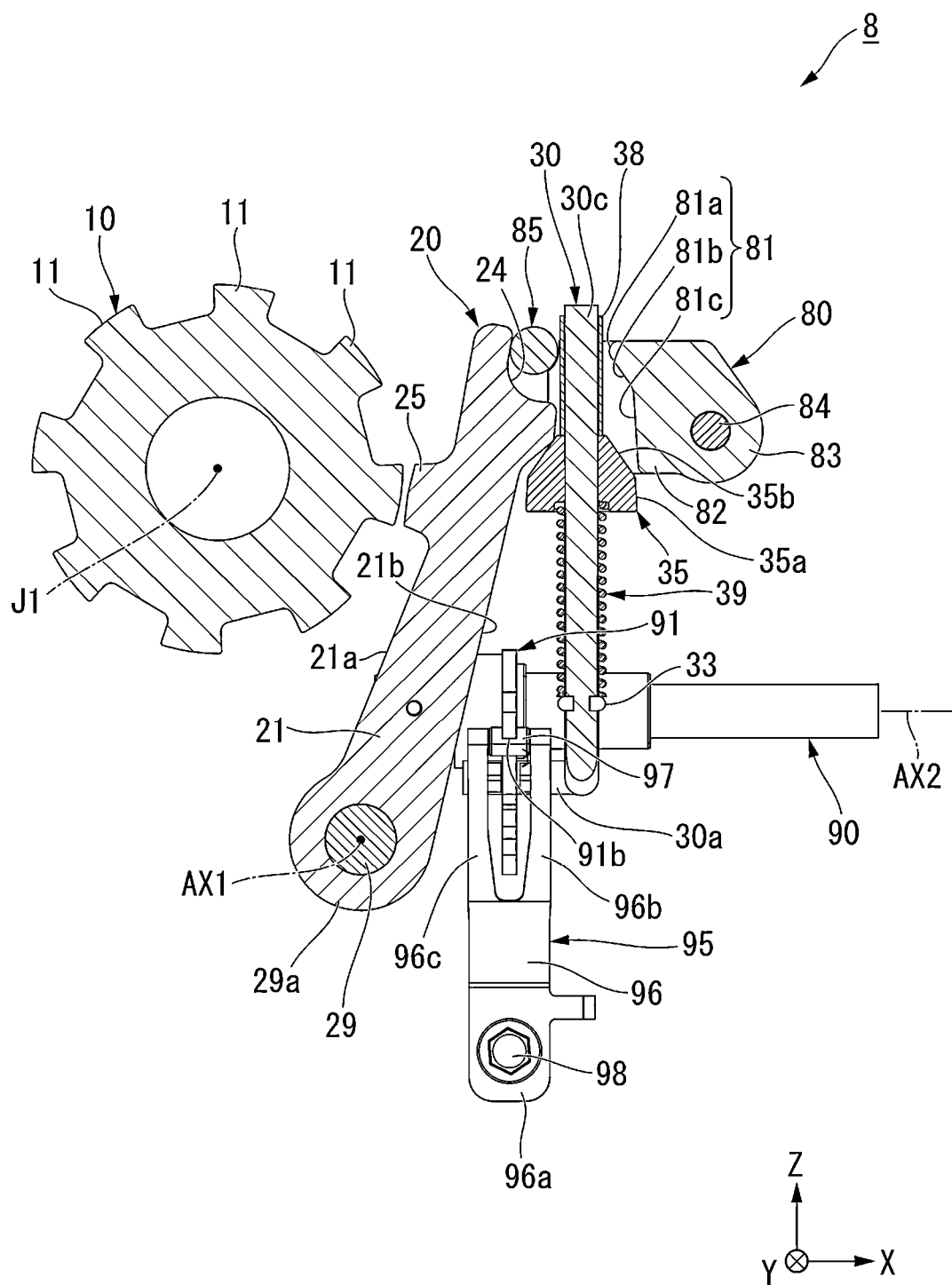
FIG. 5 is a perspective view of the parking mechanism in an unlocked state according to the embodiment.

FIG. 4 is a cross-sectional view of the parking mechanism 8 in the locked state, and FIG. 5 is a cross-sectional view of the parking mechanism 8 in the unlocked state.

The cam 35 is attached to the cam rod 30 and moves in the up-down direction together with the cam rod 30. The cam 35 is located at the upper end portion of the movable range and comes into contact with the cam contact portion 23 on the first conical surface 35a in the parking mechanism 8 in the locked state as illustrated in FIG. 4. On the other hand, the cam 35 and the cam rod 30 are located at a lower end portion of the movable range in the parking mechanism 8 in the unlocked state as illustrated in FIG. 5. In this manner, the cam 35 comes into contact with the cam contact portion 23 of the parking pawl 20 on the second conical surface 35b.

When the state of the parking mechanism 8 is switched between the locked state and the unlocked state, the cam 35 moves along the up-down direction with the operation of the cam rod 30. At this time, the cam 35 slides on the cam contact portion 23 on the second conical surface 35b. In this manner, the cam 35 rotates the parking pawl 20 about the first rotation axis AX1 to move the meshing portion 25 toward the parking gear 10.

A cam and a cam rod of a conventional structure operate in the same direction as a rotation axis of a parking pawl. That is, the cam and the cam rod of the conventional structure operate in an axial direction of a parking gear. For this reason, a parking mechanism of the conventional structure is increased in size in the axial direction of the parking gear in order to secure operation ranges of the cam and the cam rod.

On the other hand, an operation direction of the cam 35 of the present embodiment is orthogonal to the rotation axis (first rotation axis AX1) of the parking pawl 20. For this reason, it is unnecessary for the parking mechanism 8 to arrange an operation mechanism in the axial direction of the major axis J1. That is, it is possible to suppress an increase in size of the parking mechanism 8 as a whole in the axial direction of the major axis J1 according to the present embodiment.

Figure 6:
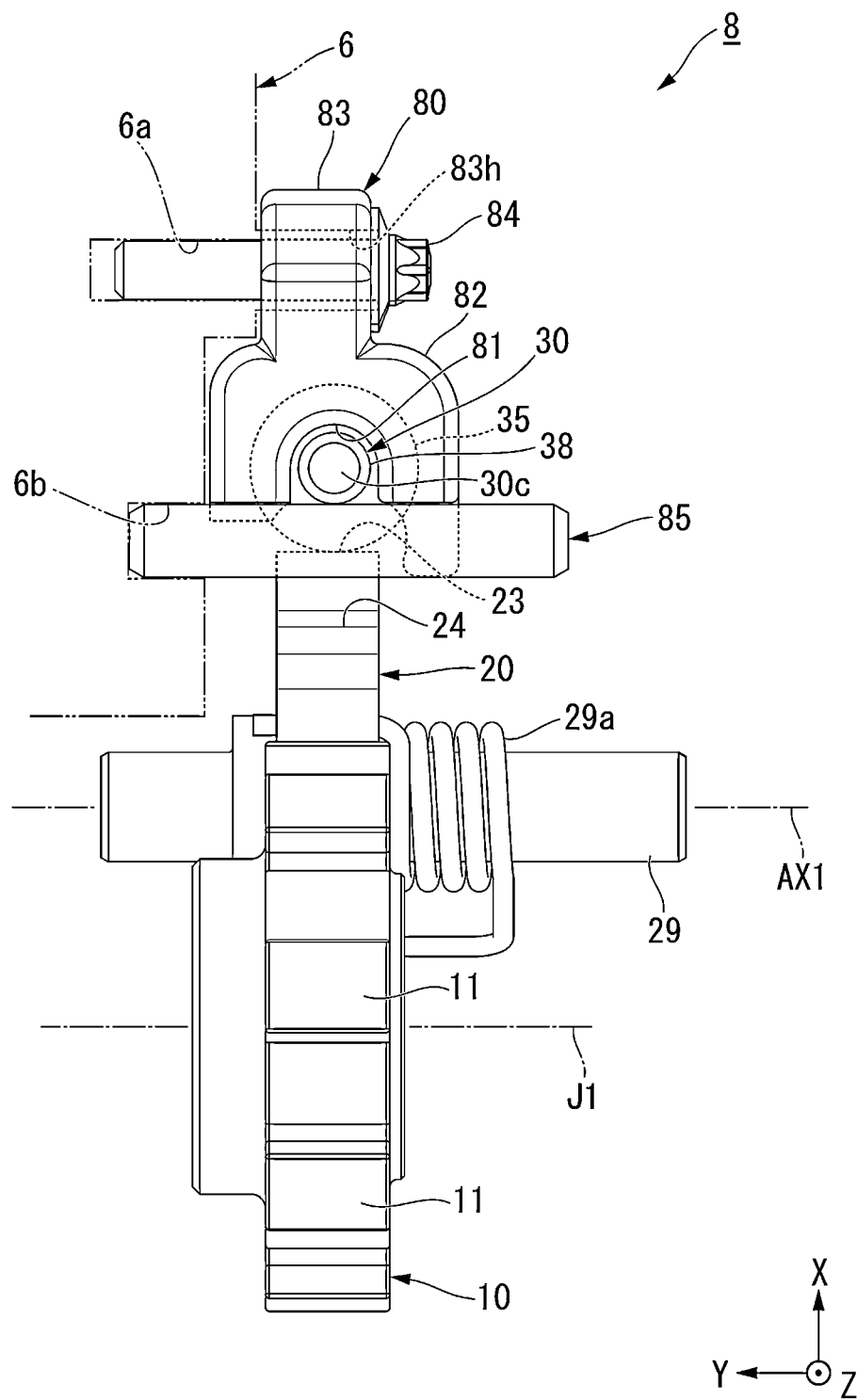
FIG. 6 is a plan view of the parking mechanism according to the embodiment when viewed from above.

FIG. 6 is a plan view of the parking mechanism 8 when viewed from above.

The sleeve 80 extends along the up-down direction. The sleeve 80 has a sleeve main body 82 and a fixing portion 83 located on the opposite side of the parking gear 10 with respect to the sleeve main body 82. The fixing portion 83 has a plate shape along a plane orthogonal to the major axis J1.

The sleeve main body 82 has a U shape when viewed from the up-down direction. That is, the sleeve 80 has the U shape that is open toward the parking pawl 20. Here, a region surrounded by an inner surface of the sleeve main body 82 will be referred to as an opening inner portion 81. The opening inner portion 81 of the sleeve main body 82 is open toward the parking pawl 20.

As illustrated in FIG. 2, the opening inner portion 81 of the sleeve main body 82 extends along a center line L extending along the up-down direction. The opening inner portion 81 is provided with a small-diameter portion 81a, a tapered portion 81b, and a large-diameter portion 81c. The small-diameter portion 81a, the tapered portion 81b, and the large-diameter portion 81c are arrayed in this order from the upper side to the lower side along the center line extending along the up-down direction. The small-diameter portion 81a surrounds the cam rod 30 from the outer side. The large-diameter portion 81c is a region having a larger diameter with respect to the center line L than the small-diameter portion 81a. The large-diameter portion 81c surrounds the cam 35 from the outer side. Therefore, a movable region of the cam 35 is provided on the inner side of the large-diameter portion 81c. The tapered portion 81b smoothly connects the large-diameter portion 81c and the small-diameter portion 81a.

As illustrated in FIGS. 4 and 5, the cam rod 30 and the cam 35 are arranged in the opening inner portion 81 of the sleeve 80. The outer peripheral surface of the cam 35 is in contact with an inner surface of the opening inner portion 81 of the sleeve 80. Further, a part of the cam rod 30 may be in contact with the inner surface of the opening inner portion 81 of the sleeve 80. In this manner, the sleeve 80 supports the cam 35 and the cam rod 30, and guides the operations of the cam 35 and the cam rod 30 in the up-down direction.

As illustrated in FIG. 2, the pawl stopper 85 has a cylindrical shape extending along the axial direction of the major axis J1. The pawl stopper 85 is arranged to be orthogonal to the cam rod 30. The pawl stopper 85 is arranged above the sleeve 80.

The pawl stopper 85 comes into contact with the stopper contact portion 24 of the parking pawl 20 in the parking mechanism 8 in the unlocked state illustrated in FIG. 5. In this manner, the pawl stopper 85 restricts the movement of the parking pawl 20 toward the cam rod 30.

As illustrated in FIG. 6, the pawl stopper 85 is positioned on the parking pawl 20 side with respect to the cam rod 30, and is arranged to be orthogonal to the cam rod 30. Therefore, the pawl stopper 85 is arranged between the parking pawl 20 and the cam rod 30.

As described above, the cam rod 30 is inserted through the opening inner portion 81 of the sleeve 80. For this reason, the movement of the cam rod 30 in a direction other than an opening direction of the sleeve 80 when viewed from the up-down direction is restricted by the inner surface of the sleeve 80. The pawl stopper 85 is arranged on the opening side of the sleeve 80 with respect to the cam rod 30 according to the present embodiment. For this reason, the cam rod 30 is prevented from falling by the sleeve 80 and the pawl stopper 85. That is, the cam rod 30 is prevented from being detached from the sleeve 80 by the pawl stopper 85.

Further, the pawl stopper 85 covers the opening side of the sleeve 80 and prevents the cam rod 30 from moving toward the parking pawl 20 according to the present embodiment, so that it is possible to prevent the cam rod 30 from rattling in the opening inner portion 81 of the sleeve 80 due to vibration or the like.

In particular, the parking mechanism 8 is accommodated in a region of the housing 6 where the oil O is stored in the present embodiment, and the sleeve 80 is arranged above an oil surface of the oil O in the gravity direction. For this reason, rattling between the sleeve 80 of the present embodiment and the cam rod 30 that is not immersed in the oil O is likely to cause noise. According to the present embodiment, the rattling of the cam rod 30 with respect to the sleeve 80 is prevented by the pawl stopper 85, the noise caused by the rattling can be sufficiently prevented even in the case of not being immersed in the oil O.

Furthermore, the cam rod 30 of the present embodiment extends along a direction orthogonal to the second direction (X-axis direction) that is the traveling direction of the vehicle as illustrated in FIG. 2. Therefore, the cam rod 30 is likely to receive an inertial force due to acceleration or deceleration of the vehicle, and the rattling with respect to the sleeve 80 is likely to cause noise. Since the rattling of the cam rod 30 with respect to the sleeve 80 is prevented by the pawl stopper 85 according to the present embodiment, the noise caused by the rattling can be sufficiently prevented even in a configuration in which the inertial force is easily received by acceleration or deceleration of the vehicle.

Note that the cam rod 30 is likely to receive the inertial force by acceleration or deceleration of the vehicle in a case where the cam rod 30 is inclined with respect to the traveling direction of the vehicle. Here, the case of being "inclined with respect to the traveling direction of the vehicle" means a case of being not parallel to the traveling direction of the vehicle, and includes a case of extending in a direction orthogonal to the traveling direction of the vehicle as illustrated in the present embodiment. Note that the inertial force is more easily received by acceleration or deceleration of the vehicle in the case where the cam rod 30 extends along the direction orthogonal to the traveling direction of the vehicle as illustrated in the present embodiment.

As illustrated in FIG. 6, the cam rod 30 passes through a region closed by the sleeve 80 and the pawl stopper 85 when viewed from a length direction of the cam rod 30. In this manner, the cam rod 30 is reliably prevented from being detached from the sleeve 80.

Figure 7:
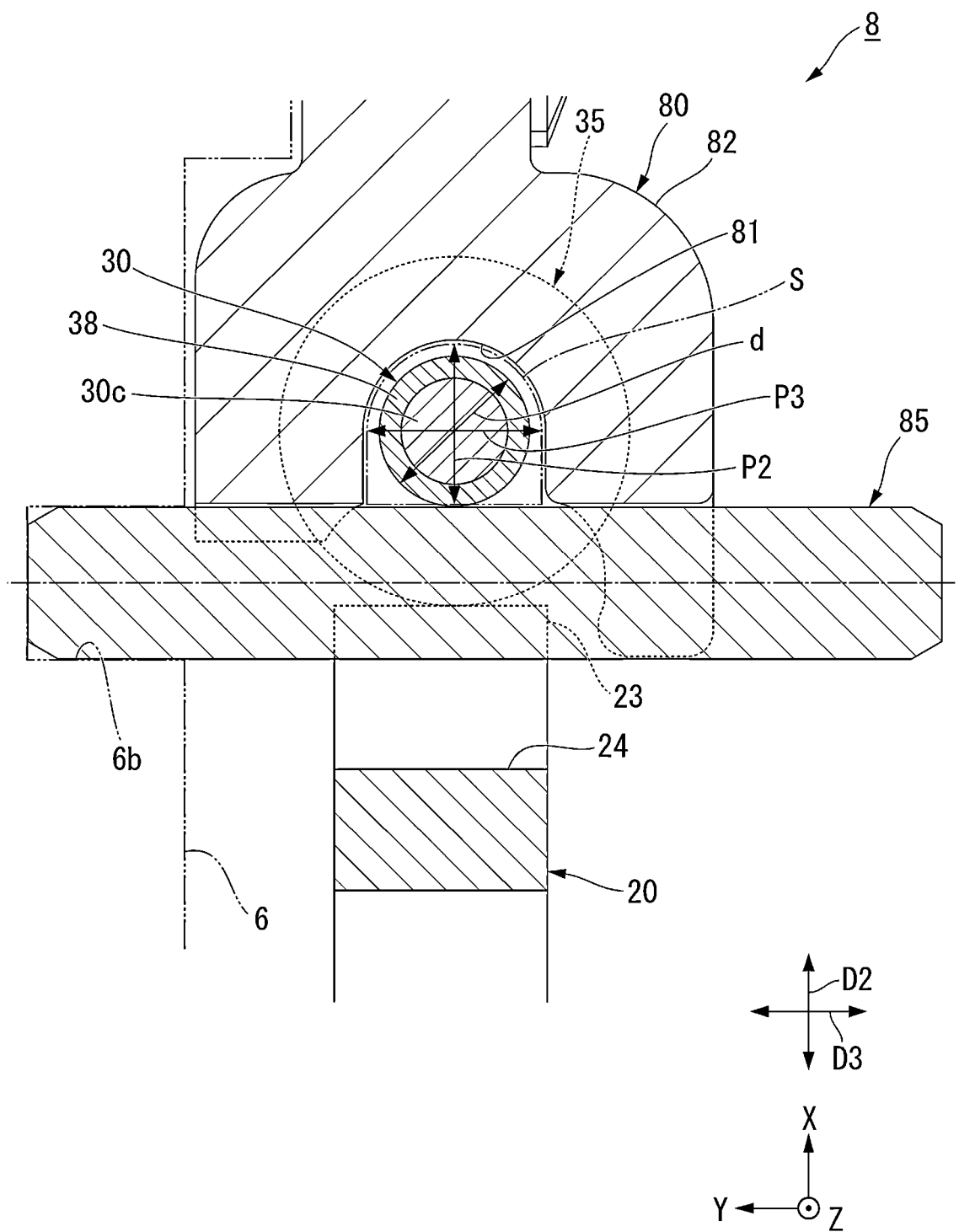
FIG. 7 is a partial cross-sectional view of the parking mechanism according to the embodiment.

FIG. 7 is a cross-sectional view of the parking mechanism 8 that is orthogonal to the length direction of the cam rod 30 and passes through the pawl stopper 85. The cam rod 30 is surrounded by the sleeve 80 and the pawl stopper 85 in the cross section illustrated in FIG. 7. In this manner, the cam rod 30 is reliably prevented from being detached from the sleeve 80.

In FIG. 7, the axial direction of the major axis J1 will be referred to as a third direction D3. A direction orthogonal to the axial direction of the major axis J1 is a second direction D2. As described above, the second direction D2 is a direction parallel to the X axis. The third direction D3 is a direction parallel to the Y axis. As illustrated in FIG. 7, a region surrounded by the opening inner portion 81 of the sleeve 80 and the pawl stopper 85 when viewed from the length direction of the cam rod 30 will be referred to as an enclosed region S. Furthermore, a dimension of the enclosed region S in the second direction D2 will be referred to as a second direction dimension P2, and a dimension of the enclosed region S in the third direction D3 will be referred to as a third direction dimension P3. A diameter d of the cam rod 30 is smaller than the second direction dimension P2 and the third direction dimension P3. The cam rod 30 passes through the enclosed region S surrounded by the sleeve 80 and the pawl stopper 85.

In the present embodiment, a difference (P2−d) in dimension between the enclosed region S and the cam rod 30 in the second direction D2 (direction orthogonal to the axial direction of the major axis J1) is smaller than a difference (P3−d) in dimension between the enclosed region S and the cam rod 30 in the third direction D3 (that is, the axial direction of the major axis J1) when viewed in the length direction (up-down direction) of the cam rod 30.

In the present embodiment, a sufficient gap is provided between the cam rod 30 and an inner surface of the enclosed region S to such an extent that the cam 35 can smoothly enter the opening inner portion 81 of the sleeve 80 even in the case where the cam rod 30 is inclined.

The cam rod 30 faces the inner surface of the sleeve 80 on both sides in the third direction D3. For this reason, components of the gap in the third direction D3 need to have sufficient sizes respectively on the both sides in the third direction D3. As a result, the difference (P3−d) in dimension between the enclosed region S and the cam rod 30 in the third direction D3 needs to be relatively large.

The cam rod 30 faces the pawl stopper 85 on one side in the second direction D2 and faces the sleeve 80 on the other side. Among components of the gap in the second direction D2, a sufficient size is required on one side where the sleeve 80 and the cam rod 30 face each other in order to smoothly guide the cam 35 to the opening inner portion 81 of the sleeve 80. On the other hand, the interference between the cam 35 and the pawl stopper 85 does not become a problem, and it is unnecessary to sufficiently secure the gap on the other side where the pawl stopper 85 and the cam rod 30 face each other among the components of the gap in the second direction D2. This point will be described in detail hereinafter.

In the parking mechanism 8 in the locked state illustrated in FIG. 5, the cam 35 reaches an upper end in the movable region and is closest to, but does not come into contact with, the pawl stopper 85. That is, in the movable range of the cam 35 and the cam rod 30, there is no interference between the cam 35 and the pawl stopper 85. For this reason, the pawl stopper 85 and the cam rod 30 can be arranged close to each other in the second direction D2 as illustrated in FIG. 7, and the components of the gap in the second direction D2 can be reduced. As a result, the difference (P2−d) in dimension between the enclosed region S and the cam rod 30 in the second direction D2 can be made relatively small.

According to the present embodiment, the pawl stopper 85 is located on the upper side (the other side in the first direction) of the cam 35 in the locked state. Since the pawl stopper 85 is arranged in this manner, the pawl stopper 85 and the cam 35 do not interfere with each other, and the components of the gap in the second direction D2 can be reduced. As a result, the parking mechanism 8 can be downsized in the second direction D2.

As illustrated in FIG. 2, the sleeve 80 and the pawl stopper 85 are individually provided according to the present embodiment. For this reason, the shapes of the sleeve 80 and the pawl stopper 85 can be simplified as compared with a case where the pawl stopper is provided in a part of the sleeve. As a result, the rigidity of the pawl stopper 85 is increased so that it is easy to suppress damage when the parking pawl 20 collides with the pawl stopper 85. Further, sufficient strength can be secured even if the pawl stopper 85 is downsized since the shape of the pawl stopper 85 can be simplified, which can contribute to downsizing of the parking mechanism 8.

More specifically, the pawl stopper 85 has the cylindrical shape in the present embodiment. For this reason, there is no edge on an outer peripheral surface of the pawl stopper 85, and it is possible to prevent local concentration of a collision force even when the pawl stopper 85 and the parking pawl 20 collide with each other and to prevent these pawl stopper 85 and parking pawl 20 from being damaged. Furthermore, the stopper contact portion 24 of the parking pawl 20 has an arc-shaped concave shape. For this reason, the stopper contact portion 24 does not make an edge contact with the pawl stopper 85. As a result, concentration of a collision force at the time of collision is prevented, and the pawl stopper 85 and the parking pawl 20 can be prevented from being damaged.

According to the present embodiment, the sleeve 80 and the pawl stopper 85 are separate members. For this reason, it is possible to increase the degree of freedom of arrangement of the pawl stopper 85 as compared with a case where these sleeve 80 and pawl stopper 85 are configured as a single member. The pawl stopper 85 of the present embodiment is located on the upper side (the other side in the first direction) of the sleeve 80. For this reason, the pawl stopper 85 can be arranged to be reliably separated from the operation range of the cam 35 as compared with a case where the pawl stopper 85 is arranged on the lower side of the sleeve 80. As a result, the pawl stopper 85 can be made to hardly interfere with the cam 35 even when being brought close to the cam rod 30, and the parking mechanism 8 can be downsized in the second direction (X-axis direction).

As illustrated in FIGS. 4 and 5, the whole region of a position of the sleeve 80 in the up-down direction overlaps a position of the parking pawl 20 in the up-down direction. For this reason, the sleeve 80 does not protrude upward or downward with respect to the parking pawl 20, and the dimension of the parking mechanism 8 in the up-down direction can be downsized.

Next, a fixing structure of the sleeve 80 and the pawl stopper 85 with respect to the housing 6 will be described.

As illustrated in FIG. 6, a screw hole 6a and a fitting hole 6b are provided in the inner surface of the housing 6. Both the screw hole 6a and the fitting hole 6b extend in parallel with the major axis J1 and are open in the same direction. On the other hand, the fixing portion 83 of the sleeve 80 is provided with a fixing hole 83h penetrating in a plate thickness direction. A fixing screw 84 to be fastened to the screw hole 6a is inserted into the fixing hole 83h. The sleeve 80 is fixed to the inner surface of the housing 6 by the fixing screw 84 extending in parallel with the major axis J1. Further, the pawl stopper 85 is fitted into the fitting hole 6b. As a result, the pawl stopper 85 is fixed to the inner surface of the housing 6.

As illustrated in FIG. 2, the sleeve main body 82 and the pawl stopper 85 are arranged side by side in a clockwise direction when viewed from an insertion direction of the fixing screw 84. Further, the sleeve main body 82 and the pawl stopper 85 are in contact with each other. In other words, the sleeve 80 comes into contact with the pawl stopper 85 in a rotation direction when the fixing screw 84 is fastened. According to the present embodiment, the sleeve 80 can be positioned in the rotation direction of the fixing screw 84 by fastening the single fixing screw 84. For this reason, a plurality of fixing screws 84 are not required, the number of parts of the parking mechanism 8 can be reduced, and an assembly process of the parking mechanism 8 can be simplified. In the present embodiment, the housing 6 accommodates the respective configurations of the parking mechanism 8 such as the sleeve 80 and the pawl stopper 85. Here, the housing 6 can be regarded as a part of the parking mechanism 8. In this case, the parking mechanism 8 includes the housing 6.

In the present embodiment, the pawl shaft 29 and the manual shaft 90 are located on the lower side (one side in the first direction) of the sleeve 80. The parking pawl 20 rotates in a circumferential direction of the pawl shaft 29 around the pawl shaft 29, and the flange portion 91 rotates in a circumferential direction of the manual shaft 90 around the manual shaft 90. According to the present embodiment, driving portions of the parking mechanism 8 are arranged to be concentrated on the lower side of the sleeve 80. It is necessary to provide a sufficient space around the driving portion in order to prevent interference with the driving portion. According to the present embodiment, the driving portions are arranged in a concentrated manner, it is unnecessary to dispersedly arrange the spaces for prevent the interference, and a storage space of the parking mechanism 8 can be downsized as a whole.

Although various embodiments of the present invention are described above, structures in the embodiments and a combination of the embodiments are examples, and thus addition, elimination, replacement of structure, and other modifications can be made within a range without departing from the spirit of the present invention. Further, the present invention is not limited by the embodiments.

For example, a configuration in which the manual shaft is arranged above the parking pawl can also be adopted as a configuration different from the above-described embodiment. In this case, the attitude of the cam and the position of the stopper of the pawl may be arranged to be vertically inverted as compared with the above-described embodiment. Further, any one of the cam contact portion, the stopper contact portion, and the meshing portion 25 of the parking pawl may be arranged on the opposite side with the rotation axis interposed therebetween in the length direction of the parking pawl. In this manner, a relative positional relationship among each portion (cam contact portion, stopper contact portion, and meshing portion) of the parking pawl, the sleeve, the cam, and the like can be appropriately changed.

Further, the power unit is not necessarily the motor. The power unit may be, for example, an engine. A structure of the gear unit (transmission mechanism) is not particularly limited. The configurations and the methods described above in the present description can be combined as appropriate within a scope in which no mutual contradiction arises.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A parking mechanism comprising:
   a parking gear that rotates about a major axis in conjunction with a wheel of a vehicle;
   a parking pawl that has a meshing portion facing a tooth portion of the parking gear and is rotatable about a first rotation axis parallel to the major axis;
   a cam rod that extends along a first direction orthogonal to the major axis and operates along the first direction;
   a cam that is attached to the cam rod, is in contact with a cam contact portion of the parking pawl, and moves along the first direction with the operation of the cam rod to rotate the parking pawl around the first rotation axis and move the meshing portion toward the parking gear;
   a U-shaped sleeve that is open toward the parking pawl and supports the cam; and a pawl stopper that comes into contact with a stopper contact portion of the parking pawl to restrict movement of the parking pawl toward the cam rod,
wherein the cam rod is inserted into the sleeve, and
the pawl stopper is arranged between the parking pawl and the cam rod.

2. The parking mechanism according to claim 1, wherein the cam rod passes through a region closed by the sleeve and the pawl stopper when viewed from a length direction of the cam rod.

3. The parking mechanism according to claim 2, wherein each portion of the parking pawl is arrayed in an order of the first rotation axis, the meshing portion, the cam contact portion, and the stopper contact portion from one side to another side in the first direction.

4. The parking mechanism according to claim 1, wherein the cam rod is surrounded by the sleeve and the pawl stopper in a cross section that is orthogonal to a length direction of the cam rod and passes through the pawl stopper.

5. The parking mechanism according to claim 1, further comprising a housing that accommodates the sleeve and the pawl stopper,
wherein the pawl stopper is fixed to an inner surface of the housing,
the sleeve is fixed to the inner surface of the housing by a fixing screw extending in parallel with the major axis, and
the sleeve comes into contact with the pawl stopper in a rotation direction when the fixing screw is fastened.

6. The parking mechanism according to claim 1, further comprising:
a pawl shaft that extends along the first rotation axis and supports the parking pawl; and
a manual shaft that drives the cam rod, connected by rotating about a second rotation axis orthogonal to the first direction, along the first direction,
wherein the pawl shaft and the manual shaft are located on one side in the first direction of the sleeve.

7. The parking mechanism according to claim 6, wherein the pawl stopper is located on another side in the first direction of the sleeve.

8. The parking mechanism according to claim 1, wherein the parking pawl has a parking pawl main body portion, and
the stopper contact portion has a concave shape recessed from the parking pawl main body portion toward the parking gear.

9. The parking mechanism according to claim 8, wherein the stopper contact portion has an arc-shaped concave shape.

10. The parking mechanism according to claim 1, wherein the parking pawl has a parking pawl main body portion, and
the cam contact portion protrudes from the parking pawl main body portion toward the sleeve.

11. The parking mechanism according to claim 1, wherein a whole region of a position of the sleeve in the first direction overlaps a position of the parking pawl in the first direction.

12. The parking mechanism according to claim 1, wherein the pawl stopper is located on another side in the first direction of the cam in a locked state in which the meshing portion meshes with the tooth portion of the parking gear.

13. The parking mechanism according to claim 12, wherein
the cam rod passes through an enclosed region surrounded by the sleeve and the pawl stopper when viewed from a length direction of the cam rod, and
a difference in dimension between the enclosed region and the cam rod in a direction orthogonal to an axial direction of the major axis when viewed from the length direction of the cam rod is smaller than a difference in dimension between the enclosed region and the cam rod in the axial direction of the major axis.

14. The parking mechanism according to claim 1, wherein the cam rod extends in a direction inclined with respect to a traveling direction of the vehicle.

15. The parking mechanism according to claim 1 being accommodated in a region where oil is stored,
wherein the sleeve is arranged above an oil surface of the oil in a gravity direction.

16. The parking mechanism according to claim 1, wherein the pawl stopper has a cylindrical shape.

17. A drive apparatus comprising:
the parking mechanism according to claim 1;
a power unit that drives the vehicle; and
a transmission mechanism connected to the power unit,
wherein the parking mechanism is attached to the transmission mechanism.

* * * * *